(12) United States Patent
Lo (10) Patent No.: US 7,167,923 B2
(45) Date of Patent: Jan. 23, 2007

(54) SYSTEM AND METHOD FOR SELECTIVELY BRIDGING AND ROUTING DATA PACKETS BETWEEN MULTIPLE NETWORKS

(75) Inventor: Kwoktung B. Lo, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 937 days.

(21) Appl. No.: 09/907,178

(22) Filed: Jul. 16, 2001

(65) Prior Publication Data

US 2002/0026528 A1 Feb. 28, 2002

Related U.S. Application Data

(60) Provisional application No. 60/227,722, filed on Aug. 24, 2000.

(51) Int. Cl.
*G06F 15/16* (2006.01)
(52) U.S. Cl. .................. 709/245; 709/226; 709/229; 709/232; 709/236; 709/249; 370/389; 370/392; 710/3; 710/30
(58) Field of Classification Search ................ 709/223, 709/224, 227, 245, 226, 229, 232, 236, 249, 709/338, 389, 392; 370/52, 389, 401, 475, 370/352; 710/3, 4, 26, 30
See application file for complete search history.

(56) References Cited

U.S. PATENT DOCUMENTS

| 5,673,322 | A | * | 9/1997 | Pepe et al. .................. 705/52 |
| 5,826,032 | A | | 10/1998 | Finn et al. |
| 5,999,525 | A | | 12/1999 | Krishnaswamy et al. |
| 6,047,325 | A | * | 4/2000 | Jain et al. ................... 709/227 |
| 6,067,568 | A | | 5/2000 | Li et al. |
| 6,105,100 | A | | 8/2000 | Dean et al. |

(Continued)

FOREIGN PATENT DOCUMENTS

JP     02001251362 A  *  9/2001

(Continued)

OTHER PUBLICATIONS

Notice of Transmittal of International Preliminary Examination Report, mailed on Apr. 29, 2003, pp. 1 total.

*Primary Examiner*—ThuHa Nguyen
(74) *Attorney, Agent, or Firm*—Blakely, Sokoloff, Taylor & Zafman LLP (57) ABSTRACT

A system and method to permit efficient communication between multiple devices having different network protocols and to permit a private network device to conduct a direct PPPoE session without restricting other devices on the private network from using another IP address. In particular, a gateway device is provided that translates and routes data packets between devices of different network protocols by referring to a table of device addresses and physical port information. Advantageously, the gateway device may maintain the table dynamically. An entry is created for a device the first time it sends a packet over the network, and an entry is deleted if a device has not sent a packet for a predetermined time interval. If no entry exists corresponding to a packet's destination, the packet is sent to all devices on the network. Finally, the gateway device also identifies the ethertype of data packets and routes them accordingly.

19 Claims, 8 Drawing Sheets

U.S. PATENT DOCUMENTS

| | | | |
|---|---|---|---|
| 6,434,627 B1 * | 8/2002 | Millet et al. | 709/245 |
| 6,480,508 B1 * | 11/2002 | Mwikalo et al. | 370/475 |
| 6,507,585 B1 * | 1/2003 | Dobson | 370/420 |
| 6,674,767 B1 * | 1/2004 | Kadyk et al. | 370/466 |
| 6,704,317 B1 * | 3/2004 | Dobson | 370/401 |
| 6,711,162 B1 * | 3/2004 | Ortega et al. | 370/389 |
| 6,747,979 B1 * | 6/2004 | Banks et al. | 370/401 |
| 6,754,709 B1 * | 6/2004 | Gbadegesin | 709/227 |
| 6,822,955 B1 * | 11/2004 | Brothers et al. | 370/389 |
| 6,853,637 B1 * | 2/2005 | Norrell et al. | 370/352 |
| 6,965,614 B1 * | 11/2005 | Osterhout et al. | 370/466 |
| 2001/0030977 A1 * | 10/2001 | May | 370/475 |

FOREIGN PATENT DOCUMENTS

WO    WO2004/043046 A1 *   5/2004

* cited by examiner

SYSTEM AND METHOD FOR SELECTIVELY BRIDGING AND ROUTING DATA PACKETS BETWEEN MULTIPLE NETWORKS

CROSS-REFERENCE TO RELATED APPLICATION

This application is related to, and claims the benefit of, U.S. Provisional Patent Application Ser. No. 60/227,722, entitled "System And Method for Selectively Bridging and Routing Data Packets Between Multiple Networks," filed Aug. 24, 2000, the subject matter of which is hereby incorporated by reference.

BACKGROUND

1. Technical Field

The present system and method generally relate to electronic networks, and more particularly to a system and method for selectively bridging and routing data packets between multiple networks.

2. Description of the Background Art

Network devices frequently transmit and receive data according to certain protocols. For example, network devices may communicate with each other using protocols such as USB, HomePNA, Ethernet, AppleTalk, HomeRF wireless, 802.11b wireless, and the like. However, configuring and managing a network that permits devices that use different protocols to communicate with each other can be burdensome and expensive.

Moreover, in some network configurations, multiple network devices are coupled to a gateway, which interfaces the multiple network devices with a public network, such as the Internet. Commonly, such a gateway will have a public, or routable, IP address and will serve as a proxy for the multiple network devices that sit behind the gateway. Pursuant to this configuration, each of the multiple network devices has a private IP address that is valid only on the private network. It may be desirable, or necessary, in some instances, however for one or more of the multiple network devices that reside behind the gateway to conduct a direct PPPoE (Point-to-Point Protocol over Ethernet) session over the Internet.

Accordingly, a need exists for a system and method by which multiple devices having different protocols may efficiently communicate with each other. An additional need exists for a system and method by which a private network device can conduct a direct PPPoE session over the Internet through a gateway device.

SUMMARY OF THE INVENTION

A system and method are disclosed to permit efficient communication between multiple devices having different network protocols and to permit a private network device to conduct a direct PPPoE session without restricting other devices on the network from using another IP address.

In general, the invention provides a gateway device that couples multiple physical networks. These physical networks may include both private networks, such as home networks, and public networks, such as the Internet. The various devices connected to the physical networks may each use different network protocols. The gateway device stores a device address and physical port information of the various devices and uses this information to translate and route data packets between the various devices. In addition, the gateway device identifies the ethertype of data packets and routes them accordingly, which enables a device on a private network to conduct a PPPoE session without interfering with the ability of another device on the private network to use a different IP address.

According to one embodiment, the gateway device stores the device address and physical port information as a dynamic look-up table in random access memory. The gateway device creates a table entry for each device the first time the device sends a data packet over the network and deletes the entry if the device does not send a data packet for a predetermined length of time.

Then, as the gateway device receives data packets, it refers to the look-up table to determine the physical port information for the destination device of the packet. The gateway device then translates the data packet using a device driver and sends the data packet to the physical port corresponding to the destination device. If the look-up table contains no entry corresponding to the destination device, the gateway device sends the data packet to all devices on the network.

Other advantages and features of the invention will be apparent from the drawings and detailed descriptions as set forth below.

DETAILED DESCRIPTION OF THE DRAWINGS

Figure 1:
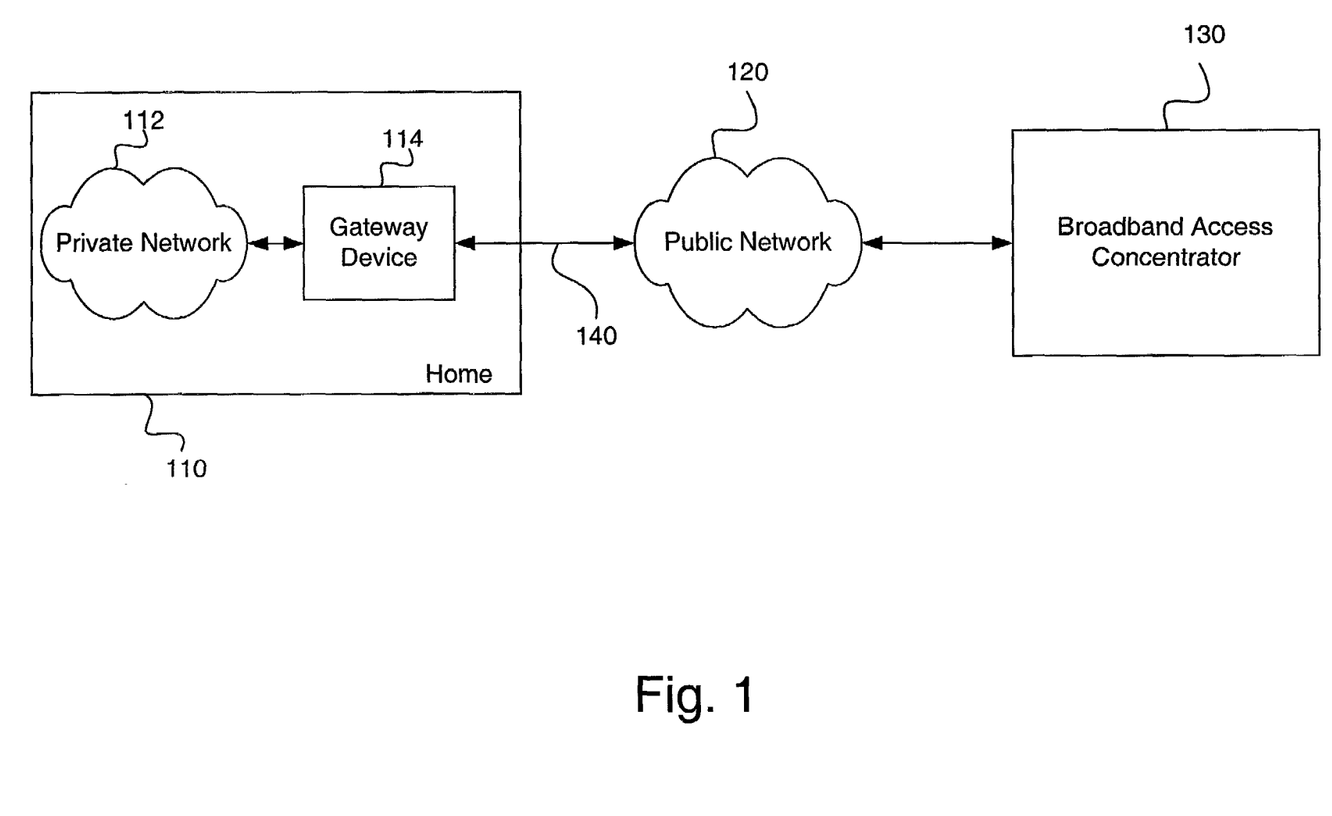
FIG. 1 is a block diagram of one embodiment of an electronic network.

FIG. 1 is a block diagram of one embodiment of an electronic network. A home 110 is connected via a broadband link 140 to a public network 120 that communicates with a broadband access concentrator 130. Home 110 includes a private network 112 that communicates via a gateway device 114 and broadband link 140 with public network 120.

Broadband link 140 may be implemented as a digital subscriber line (DSL) link, a digital cable link, or any other type of broadband communication link. Private network 112 and gateway device 114 are further discussed below.

Figure 2:
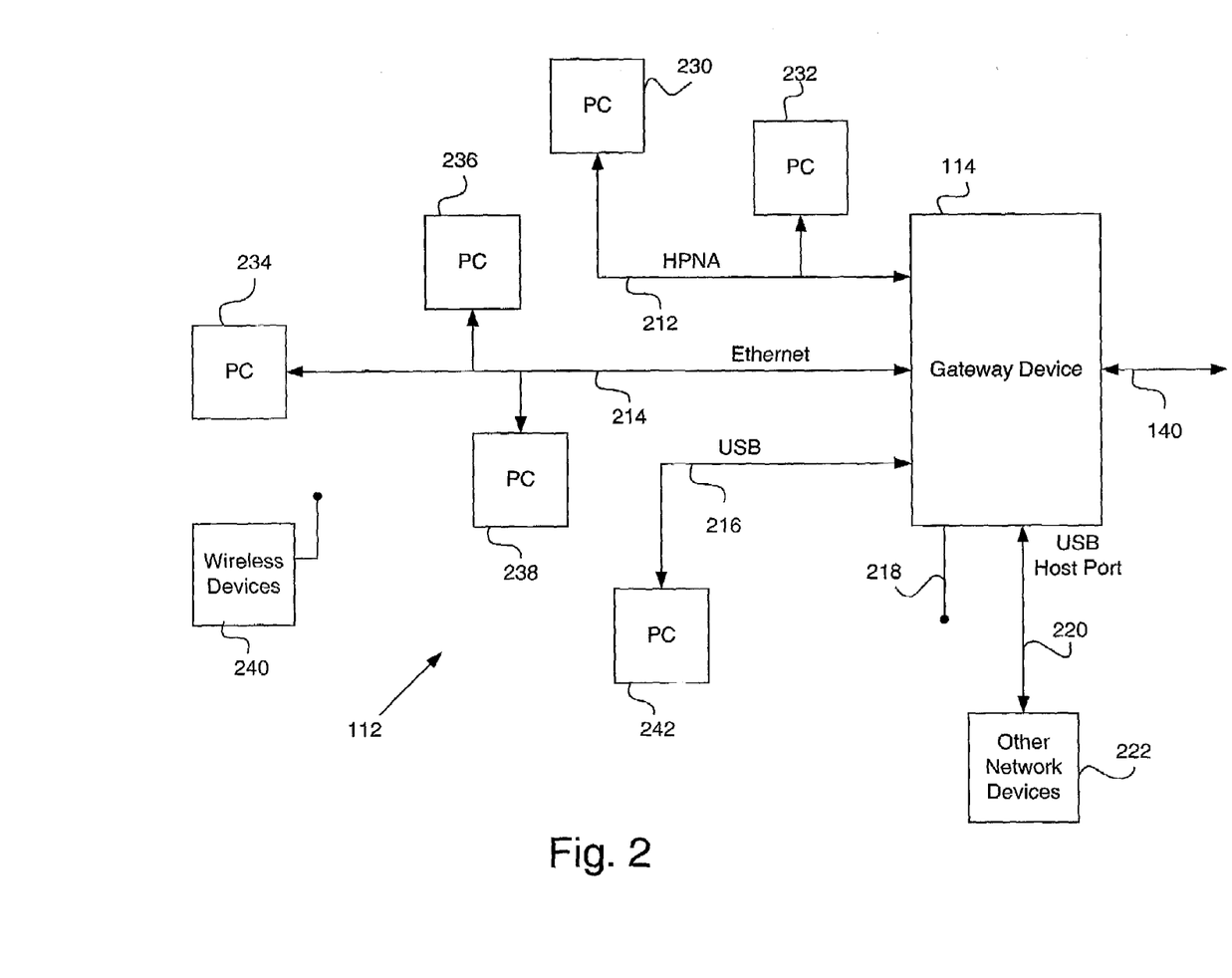
FIG. 2 is a block diagram of one embodiment of the private network and the gateway device of FIG. 1.

FIG. 2 is a block diagram of one embodiment of the private network 112 and the gateway device 114 of FIG. 1. As illustrated, the private network 112 comprises a bridged network having several physical networks, including a Home Phoneline Networking Alliance (HPNA or Home-PNA) physical network 212, an Ethernet physical network 214, a Universal Serial Bus (USB) device physical network 216, a wireless physical network 218, and a USB host physical network 220. Personal computers (PC) 230 and 232 are connected to HPNA network 212 and communicate with gateway device 114 using an HPNA protocol. Personal computers (PC) 234, 236, and 238 are connected to Ethernet network 214 and communicate with gateway device 114 using an Ethernet protocol. PC 242 is connected to USB network 216 and communicates with gateway device 114 using a USB protocol. Although PCs are shown in FIG. 2, any networking device may be used in private network 112, including Apple Macintosh® computers, which may employ the AppleTalk protocol, printers, scanners, telephony equipment, and the like.

Wireless devices 240 communicate with gateway device 114 via wireless network 218 using any appropriate wireless communication protocol, such as HomeRF or 802.11b. Other network devices 222 may be connected to USB host network 220. For example, a USB-to-powerline networking device may be connected to gateway device 114 via USB host network 220.

Gateway device 114 allows each PC or other device in private network 112 to communicate with any other device on the bridged private network 112. Gateway device 114 creates a virtual one-wire private network where each device appears to be connected to every other device, even though devices may be connected to different ports of gateway device 114 and may use different protocols.

Gateway device 114 achieves this virtual one-wire network by translating the protocol of each packet it receives into the protocol used by the receiving device. For example, if PC 230 sends a packet to PC 238, gateway device 114 receives an HPNA packet from PC 230, translates that packet into an Ethernet packet, and then sends the Ethernet packet to PC 238. This translation process is invisible to PCs 230 and 238. Gateway device 114 transmits a packet to the destination device over the physical network to which the destination device is connected and in the protocol of that physical network.

Figure 3:
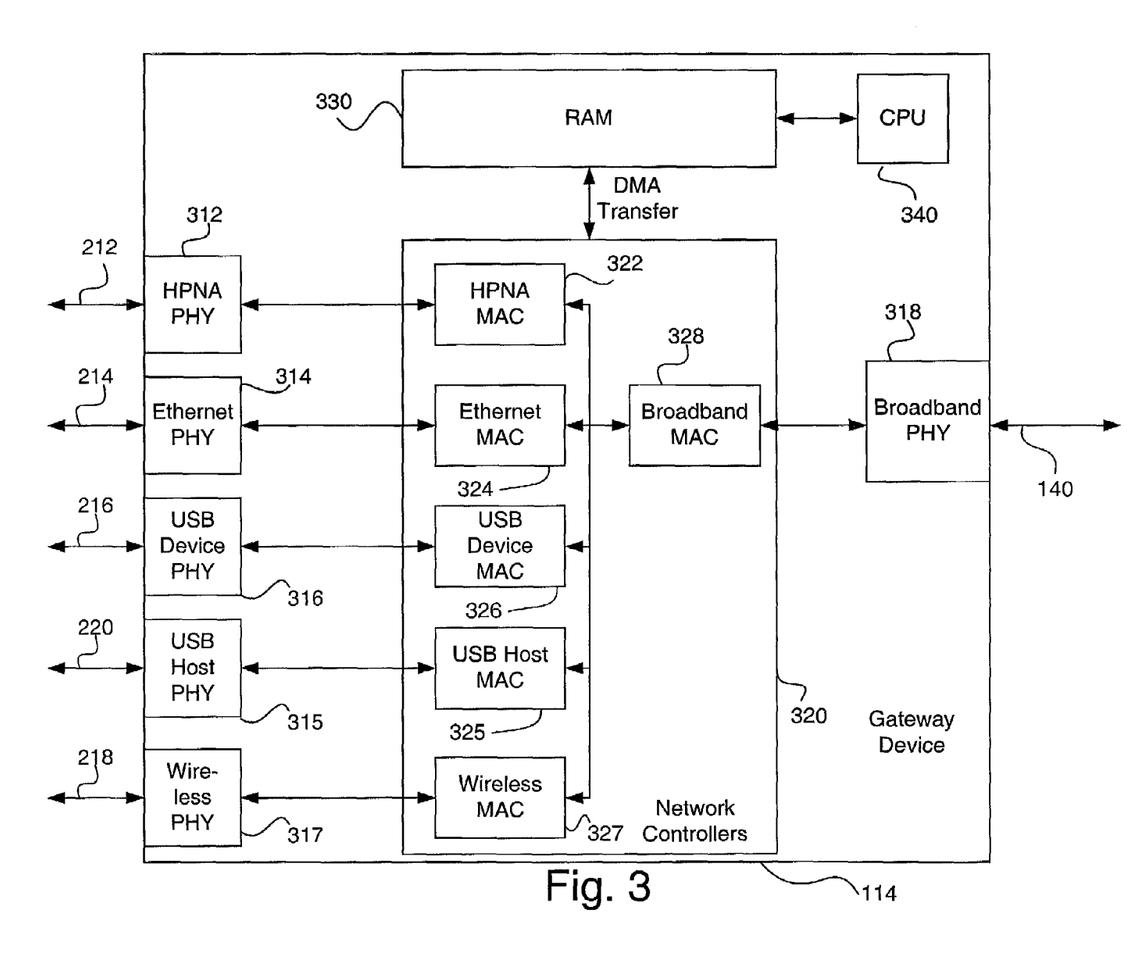
FIG. 3 is a block diagram of one embodiment of the gateway device of FIG. 2.

FIG. 3 is a block diagram of one embodiment of the gateway device of FIG. 2. Gateway device 114 includes, but is not limited to, an HPNA physical layer (PHY) 312, an Ethernet PHY 314, a USB host PHY 315, a USB Device PHY 316, a wireless PHY 317, a broadband PHY 318, network controllers 320, a random access memory (RAM) 330, and a central processing unit (CPU) 340. Each of the PHYs 312–318 further comprises a port or a logical extension thereof.

Network controllers 320 include an HPNA Media Access Control (MAC) 322, an Ethernet MAC 324, a USB Host MAC 325, a USB Device MAC 326, a wireless MAC 327, and a broadband MAC 328. The various MACs may be embodied in one or more integrated circuit packages. Each MAC of network controllers 320 communicates with RAM 330 using a direct memory access (DMA) transfer. Software modules stored in RAM 330, in conjunction with CPU 340, control the transfer of packets among the various ports of gateway device 114.

Each packet received by gateway device 114 is translated first into an Ethernet packet, except for packets received on Ethernet port 214. A network device driver (not shown) for each port is configured to convert the native packet type into an Ethernet packet, and convert an Ethernet packet into the native packet type. Techniques for this conversion are not discussed here as they are known in the art.

Figure 4:
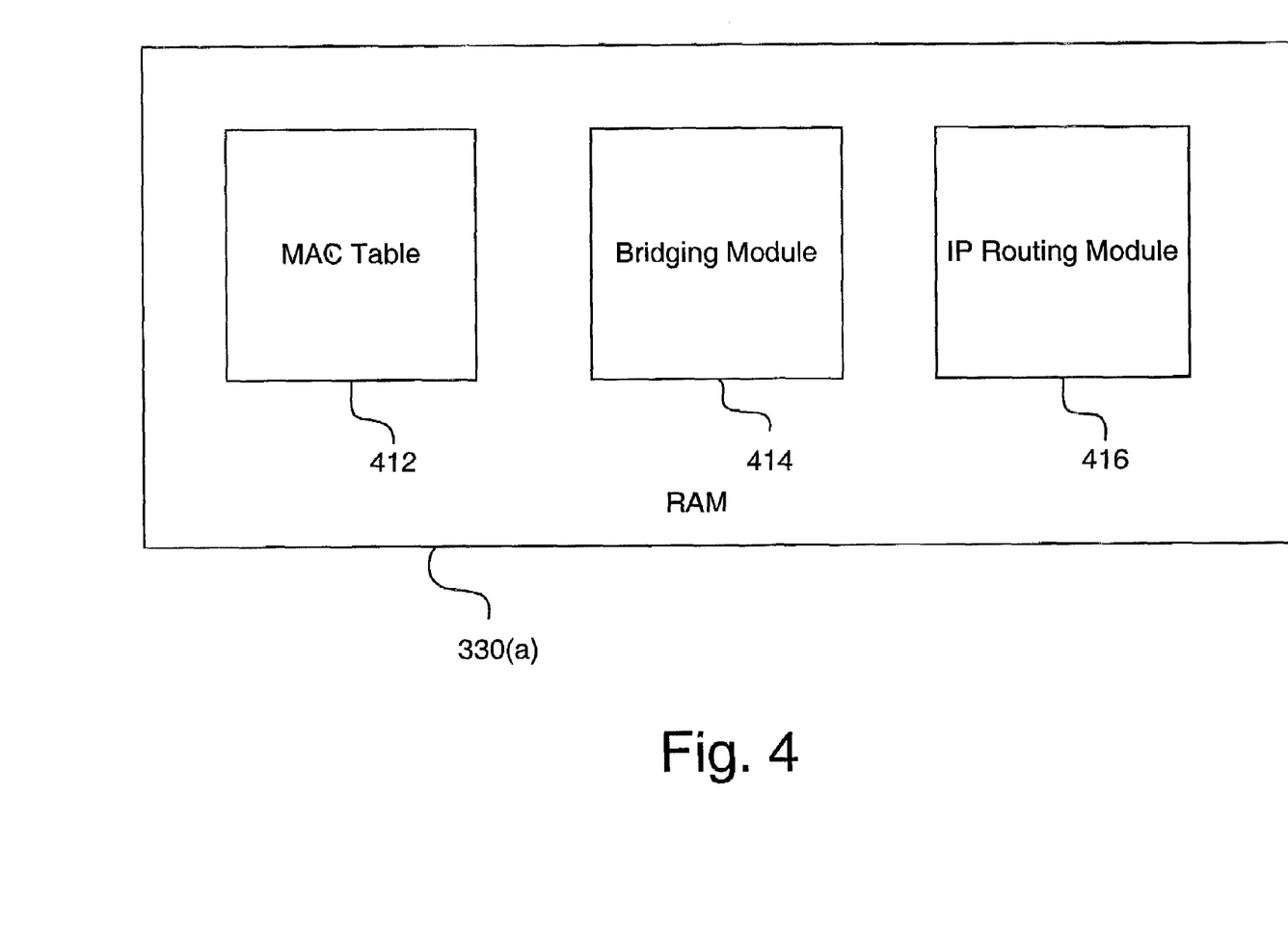
FIG. 4 is a block diagram of one embodiment of the random access memory of FIG. 3.

FIG. 4 is a block diagram of one embodiment of the random access memory of FIG. 3. The FIG. 4 embodiment of RAM 330(*a*) includes, but is not limited to, a MAC table 412, a bridging module 414, and an IP routing module 416.

When gateway device 114 initially starts up, MAC table 412 is empty. When one of the devices in private network 112 sends a packet, gateway device 114 receives that packet and bridging module 414 creates an entry in MAC table 412. The table entry includes the MAC address for the device and the logical port of gateway device 114 that received the packet. For example, if PC 230 sends a packet, bridging module 414 will create an entry in MAC table 412 that includes the MAC address of PC 230 and a number associated with and identifying the port, or logical extension thereof, through which the gateway 114 received the packet, in this case the HomePNA port 312. Each network device has a unique MAC address.

The contents of MAC table 412 are dynamic. Any device that is added to private network 112 will be added to MAC table 412 as soon as the network device transmits a packet received by gateway 114 via one of the ports 312–317 (FIG. 3). Also, if no packet is received from a device for a predetermined time, then the entry in MAC table 412 for that device will be deleted.

Bridging module 414 uses the contents of MAC table 412 to send each packet to the correct destination. Bridging module 414 finds the MAC address of the destination device specified in a transmitted packet, and looks up that MAC address in MAC table 412 to determine the port of the destination device. Bridging module 414 then sends the transmitted packet to the appropriate device driver (not shown) for conversion into the appropriate format. If there is no entry in MAC table 412 for the destination device, bridging module 414 sends the Ethernet packet to all of the ports of gateway device 114. Thus, transmitted packets do not always have to be broadcast to all network devices; rather, they can be sent to only the physical network to which the destination device is connected.

IP routing module 416 controls the routing of packets between the private network 112 and the public network 120. Packets traveling across the public network are typically routed using Internet Protocol (IP). Packets received by gateway device 114 are converted to Ethernet packets and those with an ethertype of IP are forwarded to the broadband device driver (not shown). The broadband device driver converts the Ethernet packet into the type of packet utilized by broadband link 140.

Figure 5:
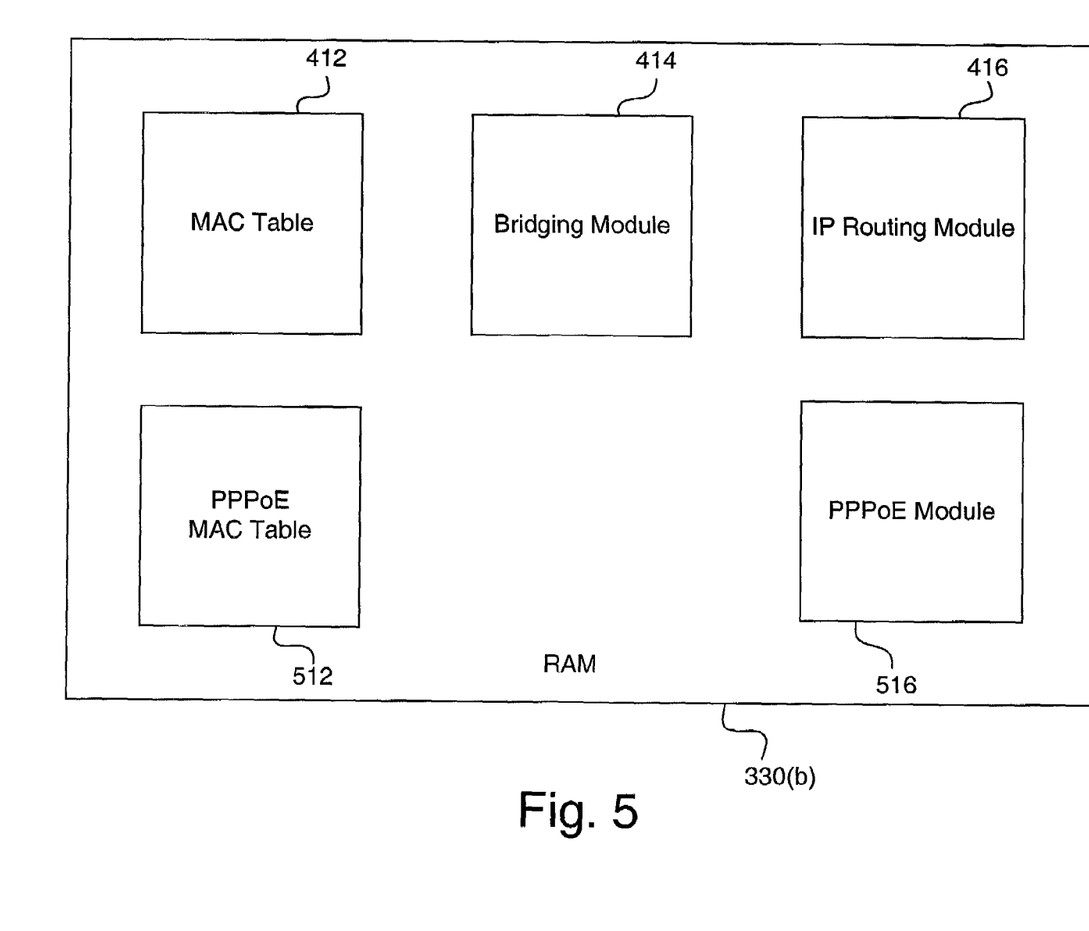
FIG. 5 is a block diagram of another embodiment of the random access memory of FIG. 3.

FIG. 5 is a block diagram of another embodiment of the random access memory of FIG. 3. RAM 330(*b*) includes, but is not limited to, MAC table 412, private network bridging module 414, IP routing module 416, a Point-to-Point Protocol over Ethernet (PPPoE) MAC table 512, and a PPPoE module 516.

The FIG. 5 embodiment of RAM 330(*b*) supports PPPoE connections between a device in private network 112 and broadband access concentrator 130 (FIG. 1). A PPPoE connection typically requires a public, or routable, IP address and allows for activities such as secure telecommuting. However, Internet service providers typically only provide one IP address to home 110. PPPoE MAC table 512 and PPPoE module 516 allows a device on private network 112 to use a public IP address and bypass the IP translation of gateway device 114. Thus, one device on private network 112 may use one public IP address for a PPPoE connection without restricting other devices on private network 112 from accessing the Internet using another public IP address.

A conventional PPPoE software package may be installed on one or more PCs in private network 112. For example, a PPPoE software package may be installed on PC 230. During a PPPoE session, PC 230 sends HPNA packets to gateway device 114. Gateway device 114 converts the HPNA packets to Ethernet packets as described above. PPPoE module 516 recognizes the ethertype of these packets as PPPoE and, in response, bridges such packets. PPPoE packets typically have an Ethertype (byte 12, 13) of 0x8863 and 0x8864. PPPoE module 516 creates an entry in PPPoE MAC table 512 that includes the MAC address of PC 230 and the port type. The Ethernet packets are then sent to the broadband port driver for conversion into broadband-type packets.

When gateway device 114 receives PPPoE session packets from broadband link 140, the broadband port driver converts the incoming packets into Ethernet packets. PPPoE module 516 identifies the ethertype as PPPoE and looks up the port type of the destination device in PPPOE MAC table 512. PPPoE module then sends the Ethernet package to the appropriate port driver for conversion. PPPoE packets destined for PC 230 will be sent to the HPNA port driver, converted into HPNA packets, and then sent over HPNA port 212 to PC 230.

Figure 6:
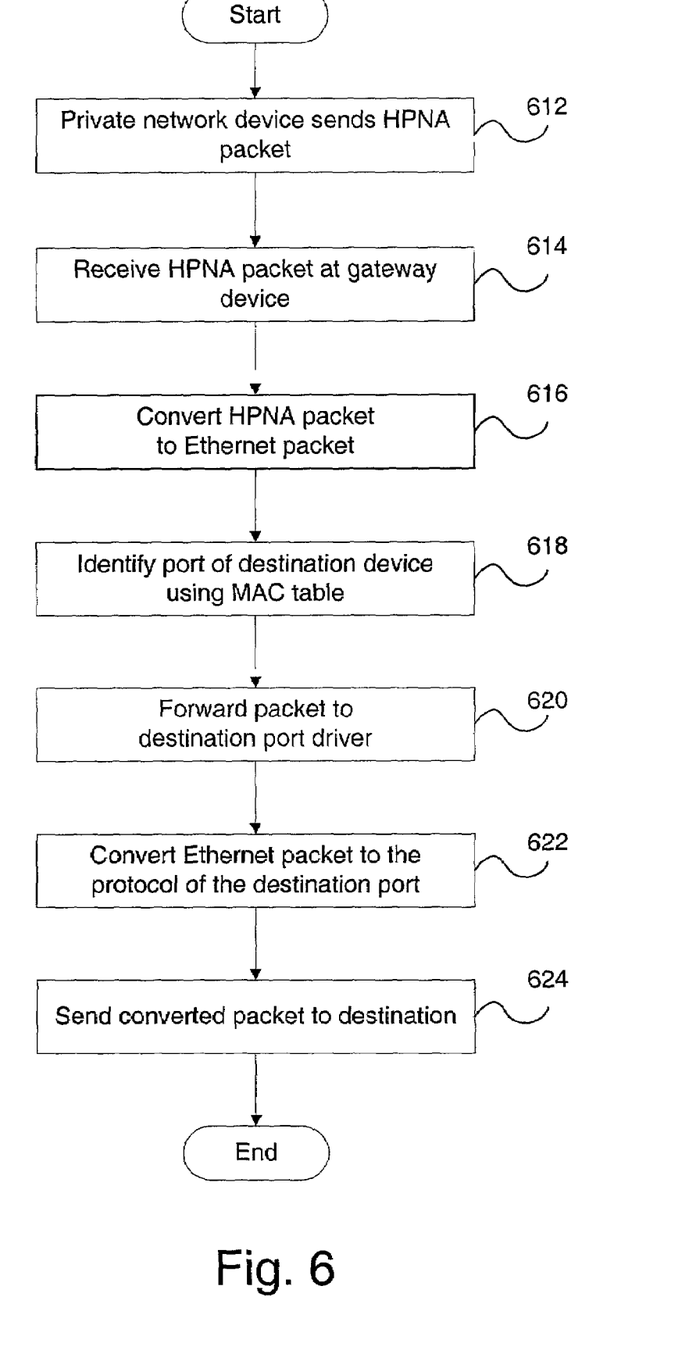
FIG. 6 is a flowchart of method steps for bridging data packets between devices on a private network, according to one embodiment.

FIG. 6 is a flowchart of example method steps for bridging data packets between devices on a private network, according to one embodiment. In FIG. 6, PC 230 is sending a packet to PC 242. In step 612, PC 230 sends an HPNA packet that, in step 614, is received by gateway device 114. In step 616, the network device driver for HPNA port 212 converts the HPNA packet into an Ethernet packet. In step 618, bridging module 214 identifies the port associated with of the destination device specified in the Ethernet packet using MAC table 212. In the FIG. 6 embodiment, the destination device is PC 242 and its port is the USB device PHY 316.

Next, in step 620, bridging module 214 forwards the Ethernet packet to the network device driver for the destination port. In step 622, the network device driver converts the Ethernet packet into its port type, in this case USB. Then, in step 624, the converted packet is sent to the destination over the appropriate port, or in this case the port 316, to the associated physical network 216 to the PC 242.

Figure 7:
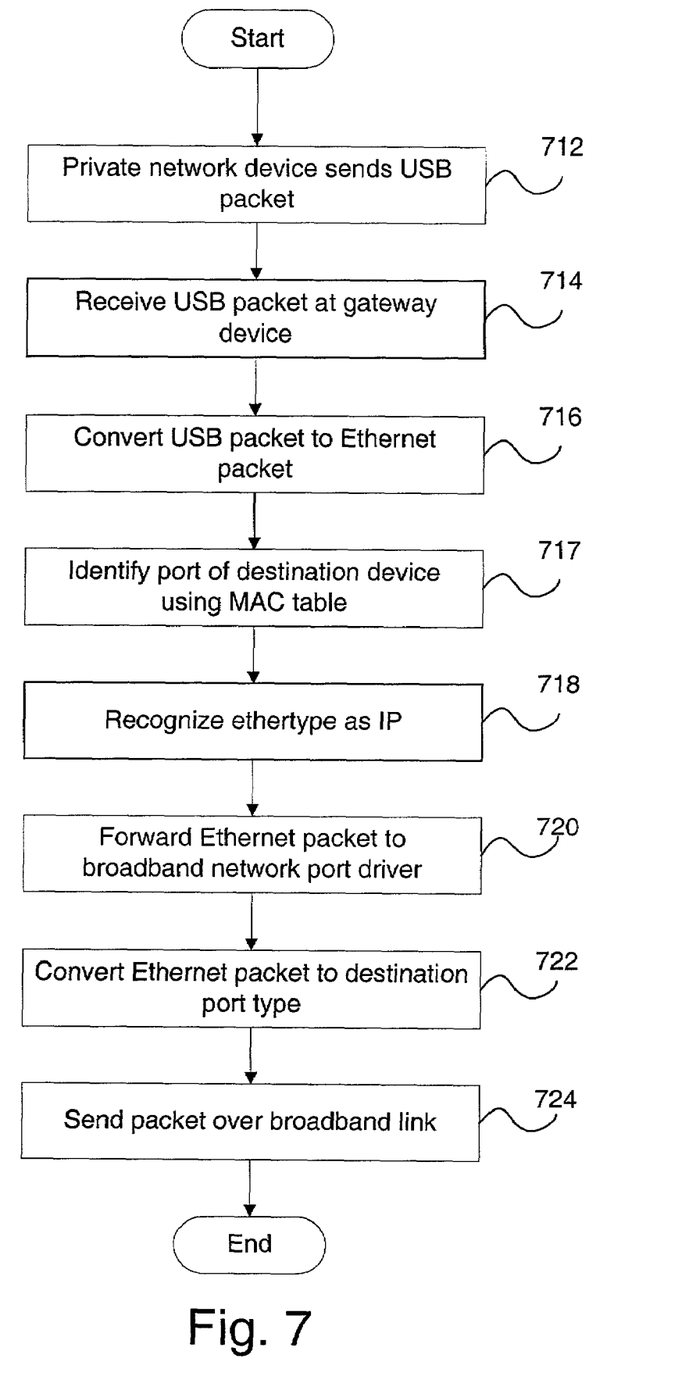
FIG. 7 is a flowchart of method steps for routing data packets between a device on a private network and a public network, according to one embodiment.

FIG. 7 is a flowchart of method steps for routing data packets between a device on a private network and a public network, according to one embodiment. In the FIG. 7 embodiment, PC 242 is sending a packet to public network 120 via broadband link 140. In step 712, PC 242 sends a packet on USB device physical network 216. In step 714, gateway device 114 receives the USB packet. Then, in step 716, the network device driver for USB port 316 converts the USB packet into an Ethernet packet. In step 717, gateway device 114 identifies the port of the destination device using MAC table 412; here the destination device is broadband access concentrator 130.

In step 718, IP routing module 416 recognizes the ethertype of the received packet as IP. Next, in step 720, routing module 416 forwards the Ethernet packet to the network device driver for broadband link 140. In step 722, the network device driver for broadband link 140 converts the Ethernet packet into the broadband port type. Then, in step 724, the broadband packet is sent to public network 120 via broadband link 140.

Figure 8:
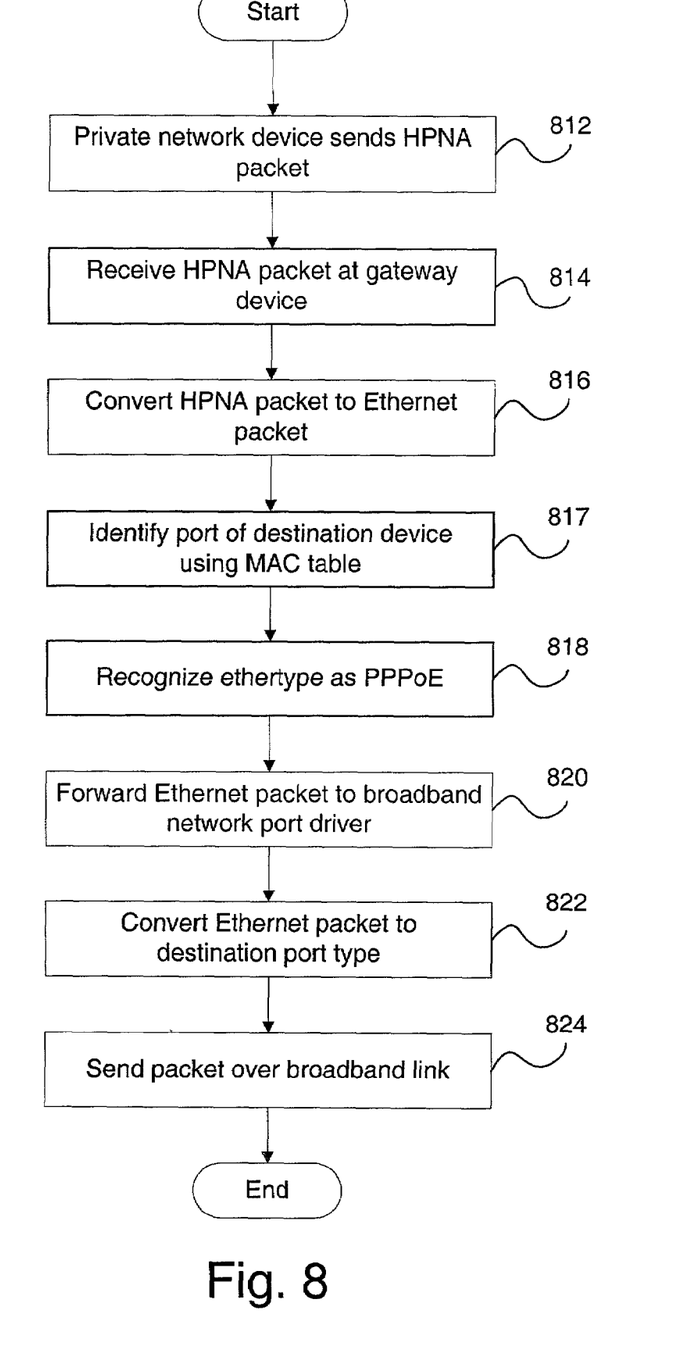
FIG. 8 is a flowchart of method steps for routing data packets between a device on a private network and a public network, according to another embodiment.

FIG. 8 is a flowchart of method steps for forwarding, or bridging, data packets between a device on a private network and a public network, according to another embodiment. In the FIG. 8 embodiment, PC 230 is communicating with broadband access concentrator 130 using a PPPoE session. First, in step 812, PC 230 sends an HPNA packet. In step 814, gateway device 114 receives the HPNA packet from HPNA port 212. Next, in step 816, the HPNA network port driver converts the HPNA packet into an Ethernet packet. In step 817, gateway device 114 identifies the port of the destination device using MAC table 412; here the destination device is broadband access concentrator 130.

In step 818, PPPoE module 516 recognizes the ethertype of the received packet as PPPoE. The Ethernet packet thus does not undergo an IP routing process and is forwarded to the broadband network port driver in step 820. In step 822, the broadband network port driver converts the received packet into the destination port type, which may be ADSL. Then, in step 824, the converted packet is sent over broadband link 140 to broadband access concentrator 130.

The invention has been explained above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for selectively bridging and routing data packets, comprising:
   a gateway device coupling a private network and a public network,
   the gateway device comprising:
      a physical port for coupling to the private network;
      a physical port for coupling to the public network;
      a network device driver for each physical port configured to convert data packets back and forth between an Ethernet protocol and a network protocol of the private network;
      a network device driver for each physical port configured to convert data packets back and forth between an Ethernet protocol and a network protocol of the public network;
      a bridging module for routing each data packet to a appropriate network device driver based on each data packet's intended destination;
      a look-up module for use by the bridging module to store device addresses and physical port information;
      a Point-to-Point Protocol over Ethernet (PPPoE) module and PPPoE Media Access Control (MAC) table for identifying and routing PPPoE data packets between a device on the private network and the public network using a first public Internet Protocol (IP) address without restricting other devices on the private network from accessing the public network using a second public IP address and allowing the device on the private network to bypass IP translation of the gateway device; and
      a look-up module for use by the PPPoE module to store device addresses and physical port information.

2. The system of claim 1, wherein the physical port for coupling to the public network is a broadband network connection.

3. The system of claim 2, wherein the gateway device further comprises an Internet Protocol (IP) module for identifying and routing IP data packets between the public network and the private network.

4. The system of claim 1, wherein the gateway device further comprises an Internet Protocol (IP) module for identifying and routing IP data packets between the public network and the private network.

5. The system of claim 1, wherein the look-up module for use by the bridging module further comprises a dynamically allocable table including entries comprising a Media Access Control (MAC) address and an identifier of a corresponding physical port of each device.

6. The system of claim 5, wherein the dynamically allocable table further includes entries comprising a Media Access Control (MAC) address and an identifier of a corresponding logical extension of a physical port for each device.

7. The system of claim 1, wherein the look-up module for use by the bridging module further comprises a dynamically allocable table including entries comprising a Media Access Control (MAC) address and an identifier of a corresponding logical extension of a physical port of each device.

8. The system of claim 1, wherein the look-up module for use by the PPPoE module further comprises a dynamically allocable table including entries comprising a Media Access Control (MAC) address and an identifier of a corresponding physical port of each device.

9. The system of claim 8, wherein the dynamically allocable table further includes entries comprising a Media Access Control (MAC) address and an identifier of a corresponding logical extension of a physical port for each device.

10. The system of claim 1, wherein the look-up module for use by the PPPoE module further comprises a dynamically allocable table including entries comprising a Media Access Control (MAC) address and an identifier of a corresponding logical extension of a physical port of each device.

11. A method of selectively bridging and routing data packets, comprising:
  receiving a data packet from a source device in a private network at one of a plurality of physical ports of a gateway device;
  identifying a network protocol of the source device;
  translating, at said physical port of the gateway device, the data packet from the network protocol of the source device to an Ethernet protocol;
  identifying an ethertype of the data packet as Point-to-Point Protocol over Ethernet (PPPoE);
  enabling a PPPoE connection between a device on the private network and a public network with a PPPoE module and PPPoE Media Access Control (MAC) table to allow the device to use a first public Internet Protocol (IP) address without restricting other devices on the private network from accessing the public network using a second public IP address and to allow the device on the private network to bypass IP translation of the gateway device;
  identifying a destination device for the data packet;
  identifying a network protocol of the destination device;
  translating, at said physical port of the gateway device, the data packet from an Ethernet protocol to the network protocol of the destination device; and
  sending the data packet to the destination device.

12. The method of claim 11, wherein the step of identifying the network protocol of the destination device includes referring to a look-up table including a device address and physical port information for each device.

13. The method of claim 12, further comprising the step of creating an entry in the look-up table each time a device first sends a data packet over the private network.

14. The method of claim 13, further comprising the step of deleting the entry in the look-up table if the device corresponding to the entry does not send a data packet over the private network for a predetermined length of time.

15. The method of claim 14, further comprising the step of sending the data packet to all devices coupled to the private network and the public network if the look-up table does not contain the entry for the destination device of the data packet.

16. The method of claim 13, further comprising the step of sending the data packet to all devices coupled to the private network and the public network if the look-up table does not contain the entry for the destination device of the data packet.

17. The method of claim 12, further comprising the step of deleting an entry in the look-up table if the device corresponding to the entry does not send a data packet over the private network for a predetermined length of time.

18. The method of claim 17, further comprising the step of sending the data packet to all devices coupled to the private network and the public network if the look-up table does not contain the entry for the destination device of the data packet.

19. The method of claim 12, further comprising the step of sending the data packet to all devices coupled to the private network and the public network if the look-up table does not contain an entry for the destination device of the data packet.

* * * * *